Sept. 12, 1967  B. BARÉNYI ETAL  3,341,248
INSTRUMENT PANEL
Filed April 29, 1965

INVENTORS.
BÉLA BARÉNYI
HERMANN RENNER

BY *Dicke & Craig*

ATTORNEYS.

3,341,248
INSTRUMENT PANEL

Béla Barényi, Stuttgart-Vaihingen, and Hermann Renner, Magstadt, Wurttemberg, Germany, assignors to Daimler-Benz Aktiengesellschaft, Stuttgart-Unterturkheim, Germany
Filed Apr. 29, 1965, Ser. No. 451,908
Claims priority, application Germany, Apr. 29, 1964, D 44,296
7 Claims. (Cl. 296—70)

ABSTRACT OF THE DISCLOSURE

An instrument panel for a motor vehicle having side wall members, wherein the instrument panel is fastened to the motor vehicle only at the side wall members, thus providing adequate support for the panel with respect to the steering wheel assembly for example, and further resulting in a construction wherein the instrument panel may yield and deform under an impact acting in a direction approximately coinciding with the longitudinal direction of the motor vehicle.

---

Figure 1:
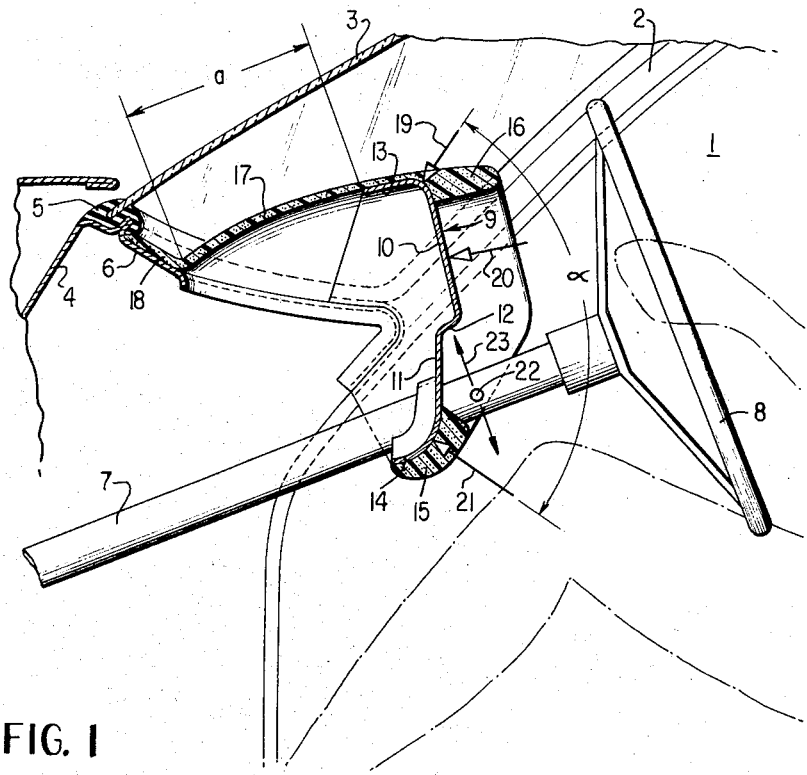

The present invention relates to an instrument panel secured only within the region of the side walls of a vehicle.

The known instrument panels have, as a rule, a very large and, above all, equal bending strength and shearing strength in all directions in order that the parts arranged thereon are connected securely with the vehicle and that they may absorb the forces occurring during operation. Such instrument panels have, up to now, been constructed practically non-yielding in the longitudinal direction of the vehicle. An arrangement for the fastening of the steering wheel is known in which a free floating rod or bar extends across the vehicle interior unto which the steering mechanism is fastened as disclosed, for instance, in French Patent 1,180,501. This arrangement serves, among other things, to support, especially in a transverse direction, the frame of a pane retracted or disposed far to the rear within the lower region thereof. The tubular member is, in its cross section, made of the same strength in all directions, and, as a result, has the same bending strength in all directions. It is additionally known for such a tubular member to connect the same in the longitudinal direction of the vehicle with the parts of the dashboard or the like arranged in front thereof by means of additional sheet-metal elements. These additional sheet-metal elements produce a considerable reinforcement and stiffening of the tubular member in the longitudinal direction of the vehicle.

The present invention aims at increasing the safety of the passengers in case of an accident, yet permitting a secure fastening and connection, for example, of the steering column at the instrument panel. The present invention essentially consists in that the bending strength as well as the shearing strength of the instrument panel is greatest in a direction about perpendicular to the steering column and is smallest in a direction about perpendicular to this plane so that that the instrument panel, when hit by body parts of the passengers during accidents, yields in the direction of the impact.

During accidents, the passengers, as a rule hit the instrument panel or parts connected thereto approximately in the direction of travel. The head usually hits the instrument panel, even with the use of safety belts, somewhat on a slant from above whereas the knees hit the instrument panel somewhat on a slant from below and the chest hits the instrument panel in the direction of travel. The present invention aims at providing yieldingness of the instrument panel in these directions so that it can deform and thus can absorb impact energy. In order to be able to absorb the forces in a direction approximately perpendicular to the steering column supported on the instrument panel, and to make impossible a lateral yielding of the steering column, a large stiffness or rigidity of the instrument panel is provided according to the present invention in an approximately vertical plane disposed transversely to the vehicle longitudinal direction as an impact of body parts of passengers is not expected in these directions.

In realization of the present invention, it may be advantageous if the cross-sectional shape of the instrument panel has about the form a "U," lying about on its side, whose legs are relatively short in relation to the height of the instrument panel and extend approximately in the direction of the steering column. Such a form and shape makes possible a high strength in the direction of the main surface of the instrument panel, yet a relatively slight strength or stiffness in the impact direction whereby, in case of impact in this direction, deformation energies may still be absorbed to a considerable degree nonetheless.

In further development of the present invention, provision may be made that the instrument panel within the region of the fastening and securing thereof at the side walls of the vehicle has, as viewed in cross section, a smaller dimension than in its middle portion in such a manner that it makes possible an easier rotation about an axis disposed approximately longitudinally through the instrument panel in a direction transverse to the vehicle. It is achieved thereby that, in the first place, the impact surface can be made sufficiently large and that additionally, in case of out-of-center or eccentric impact, a corresponding rotation of the main part of the instrument panel takes place so that a deformation in the direction of smallest strength of the instrument panel may occur.

In order that a safe connection and also the possibility for the absorption of deformation energy at the fastening places is attainable, the present invention further provides that the terminal connecting parts be made of stronger sheet metal (heavier gauge material) than the middle portion of the instrument panel. Such a differing wall thickness may also be accomplished by a corresponding deformation of the part during manufacture thereof. The possibility is thereby given for a good fastening and securing at the side walls and nevertheless a resiliency and absorption of energy capability during accidents.

Accordingly, it is an object of the present invention to provide an instrument panel for passenger motor vehicles which is simple in construction and which effectively minimizes injuries to passengers in case of accidents.

Another object of the present invention resides in the provision of an instrument panel which is so constructed and arranged that it is able to yield in the normal directions of impact of the passengers in case of accident and which has a high bending and shearing strength in a direction perpendicular thereto.

Still another object of the present invention resides in the provision of an instrument panel for motor vehicles which enables absorption of deformation energies yet securely supports all instruments without danger of inadequate support at the vehicle body.

A further object of the present invention resides in the provision of an instrument panel of the type described above which permits a secure fastening thereof laterally at the vehicle body or frame notwithstanding its ability to yield in case of impact by parts of the passengers' bodies during accidents.

Still another object of the present invention resides in the provision of an instrument panel which is not only able to yield in the driving direction but also is capable of pivoting about an axis transverse to the vehicle direction so as to further improve the passengers' safety.

Still a further object of the present invention resides in the provision of an instrument panel in which the impact surface can be made relatively large without impairing the ability to absorb deformation energy in the direction of the smallest strength of the instrument panel.

Figure 2:
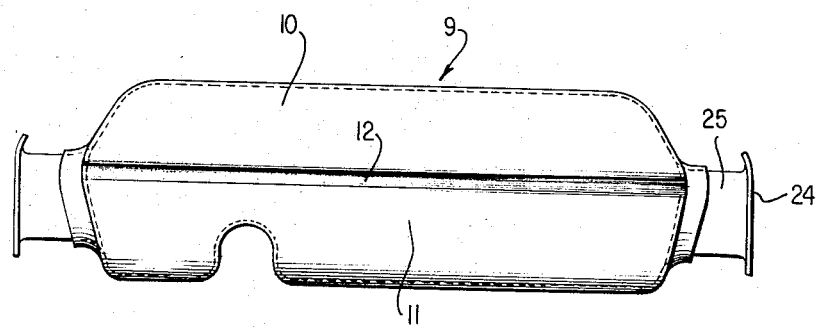

These and further objects, features, and advantages of the present invention will become more obvious from the following description when taken in connection with the accompanying drawing which shows, for purposes of illustration only, one embodiment in accordance with the present invention and wherein:

FIGURE 1 is a partial cross sectional view through a passenger motor vehicle provided with an instrument panel construction in accordance with the present invention, and FIGURE 2 is an elevational view of an inventive instrument panel according to the present invention in the non-assembled condition.

Referring to the drawing, wherein like reference numerals are used throughout the various views to designate like parts, and more particularly to FIGURE 1, there is visible in this figure a corner post or column 2 of the partially illustrated passenger motor vehicle 1 which is adjoined by the windshield 3. The sheet metal member 4, rising from the dashboard, on which is placed and mounted the windshield seal 5, is connected within a groove of the seal 5 to a sheet metal member 6 which extends in the longitudinal direction of the vehicle only a very short distance toward the passenger compartment and is slightly bent downwardly. This sheet metal 6 is not directly connected with the instrument panel. Furthermore, a steering column 7 together with steering wheel 8 is indicated schematically.

The instrument panel generally designated by reference numeral 9 is fastened at both sides of the vehicle between the corner posts or columns 2 and, as to the rest, has no further rigid connection with the vehicle body or frame. Particularly, the area *a* between the sheet metal member 6 and the instrument panel 9 is not bridged over by any sheet metal element. As a result thereof, the instrument panel 9 is able to yield approximately in the driving direction in case of an accident when the passenger hits against the same.

The instrument panel 9 is provided with two approximately vertical wall portions 10 and 11 which are offset against each other at 12 by means of a step. The upper part 10 is slightly inclined forwardly in the direction toward the windshield 3 and is bent angularly at the top thereof so that in relation to the height of the two wall portions 10 and 11, a short leg portion 13 is produced which is slightly bent downwardly in front thereof. The lower wall portion 11 passes over with a relatively large radius into a short leg portion 14 which is also bent in the direction towards the front part of the vehicle.

The instrument panel 9 made of sheet metal panels or members is provided with a plastic padding 15 which protrudes in a bulge-like manner over the surfaces of the instrument panel 9 in a direction toward the passenger compartment. A relatively thin-walled part 17 of the padding adjoins the upper bulge portion 16 for bridging the interspace *a* which also covers at 18 the sheet metal member 6 and is fastened thereon. The main directions of impact during accidents are indicated by arrows 19, 20 and 21. These directions are essentially disposed within a region indicated by the angle α.

The forces occurring at the steering column support in the instrument panel at about point 22 for supporting the steering column are disposed about perpendicular to the steering column 7 and are indicated by the arrow 23. Corresponding forces also lie perpendicular to the plane of the drawing.

Inasmuch as the instrument panel 9 is constructed relatively high, particularly in the portions 10 and 11, and extends with this height almost over the entire width of the vehicle and is secured between the columns 2 at the side wall portions of the motor vehicle adjoining the same therebelow, the forces occurring in the direction of arrows 23, which are transmitted from the steering system to the instrument panel 9, may be absorbed completely satisfactorily without impairing the stability of the steering arrangement. Since the leg portions 13 and 14 are, however, kept very short, and the instrument panel 9 is only secured at its ends, the instrument panel 9 is able to yield upon impact in the directions 19, 20, 21 and is thus able to help in lessening the injuries of the passengers during an accident. The instrument panel 9 has also a sufficient yieldingness in the directions 19 and 21, of which the latter represents the direction of impact of the passengers' knees, so that injuries are reduced or prevented.

It can be seen from FIGURE 2 that the transitions from the actual instrument panel 9, properly speaking, to the securing flanges 24, which will be connected with the side walls or the columns 2, are considerably smaller in cross section at 25 than the instrument panel 9. However, in order to assure a sufficient strength, these parts may be made of stronger or heavier sheet metal or may provide by a corresponding deformation of the entire instrument panel 9, a stronger wall strength than the parts 9 to 14. Since the center portion of the instrument panel 9 has no further rigid connection with the superstructure of the vehicle, i.e., with the vehicle body or frame, the instrument panel 9 is able to pivot under certain circumstances with an inclined or eccentrically acting load about an axis passing through the connecting parts 25 so that a further yieldingness is made possible thereby. Nevertheless, a safe and secure connection and therewith also absorption of the impact energy is possible since the connecting parts 25 are dimensioned correspondingly stronger.

While we have shown and described only one embodiment in accordance with the present invention, it is understood that the same is not limited thereto but is susceptible of numerous changes and modifications as known to a person skilled in the art. For example, the present invention may be used also to advantage with differently constructed instrument panels provided a differing strength in the aforementioned directions is given to the same. Thus, it is obvious that the present invention is not limited to the details shown and described herein but may be modified in numerous ways, and we therefore do not wish to be limited to these details but intend to cover all such changes and modifications as are encompassed by the scope of the appended claims.

We claim:
1. In a motor vehicle having side wall members and a steering column, an instrument panel, fastened to said motor vehicle only at said side wall members thereof, having its largest bending strength in a direction approximately perpendicular to the steering column and its minimum bending strength in a direction about perpendicular to the plane of said first-mentioned direction so that during impact of body parts of the passengers, in case of accidents, the instrument panel is able to yield in the impact directions.

2. In a motor vehicle having side wall members and a steering column, an instrument panel, fastened to said motor vehicle only at said side wall members thereof, having its largest bending strength in a direction approximately perpendicular to the steering column and its minimum bending strength in a direction about perpendicular to the plane of said first-mentioned direction so that during impact of body parts of the passengers, in case of accidents, the instrument panel is able to yield in the impact directions, said impact directions extending over an arc subtended by an angle substantially greater than 90°.

3. In a motor vehicle having side wall members and a steering column, an instrument panel, fastened to said motor vehicle only at said side wall members thereof, having its largest bending strength in a direction approximately perpendicular to the steering column and its minimum bending strength in a direction about perpendicular to the plane of said first-mentioned direction so that during impact of body parts of the passengers, in case of accidents, the instrument panel is able to yield in the impact directions, said instrument panel having in cross section approximately the shape of a U lying on one side thereof, the leg portions of said U-shaped instrument panel being relatively short in relation to the height of the instrument panel and extending approximately in the direction of the steering column.

4. In a motor vehicle having side wall members and a steering column, an instrument panel, fastened to said motor vehicle only at said side wall members thereof, having its largest bending strength in a direction approximately perpendicular to the steering column and its minimum bending strength in a direction about perpendicular to the plane of said first-mentioned direction so that during impact of body parts of the passengers, in case of accidents, the instrument panel is able to yield in the impact directions, said instrument panel having a substantially smaller cross-sectional area at the end portions thereof than at the center portion thereof, said end portions thereby facilitating rotation of said instrument panel about an axis extending approximately longitudinally thereof and through said end portions thereof, which are fastened to said side wall members of said motor vehicle.

5. In a motor vehicle having side wall members and a steering column, an instrument panel, fastened to said motor vehicle only at said side wall members thereof, having its largest bending strength in a direction approximately perpendicular to the steering column and its minimum bending strength in a direction about perpendicular to the plane of said first-mentioned direction so that during impact of body parts of the passengers, in case of accidents, the instrument panel is able to yield in the impact directions, said instrument panel being provided with connecting parts having a greater wall strength than the center portion of the instrument panel.

6. In a motor vehicle having side wall members and a steering column, an instrument panel, fastened to said motor vehicle only at said side wall members thereof, having its largest bending strength in a direction approximately perpendicular to the steering column and its minimum bending strength in a direction about perpendicular to the plane of said first-mentioned direction so that during impact of body parts of the passengers, in case of accidents, the instrument panel is able to yield in the impact directions, said instrument panel having in cross section approximately the shape of a U lying on one side thereof, the leg portions of said U-shaped instrument panel being relatively short in relation to the height of the instrument panel and extending approximately in the direction of the steering column, said instrument panel having a substantially smaller cross-sectional area at the end portions thereof than at the center portion thereof, said end portions thereby facilitating rotation of said instrument panel about an axis extending approximately longitudinally thereof and through said end portions thereof, which are fastened to said side wall members of said motor vehicle, said instrument panel being provided with connecting parts having a greater wall strength than the center portion of the instrument panel.

7. In a motor vehicle having side wall members and a steering column, an instrument panel, fastened to said motor vehicle only at said side wall members thereof, having its largest bending strength in a direction approximately perpendicular to the steering column and its minimum bending strength in a direction about perpendicular to the plane of said first-mentioned direction so that during impact of body parts of the passengers, in case of accidents, the instrument panel is able to yield in the impact directions, said instrument panel having in cross section approximately the shape of a U lying on one side thereof, the leg portions of said U-shaped instrument panel being relatively short in relation to the height of the instrument panel and extending approximately in the direction of the steering column, said instrument panel being provided with connecting parts having a greater wall strength than the center portion of the instrument panel.

References Cited

UNITED STATES PATENTS

| | | | |
|---|---|---|---|
| 2,070,760 | 2/1937 | Straith | 180—90 |
| 3,088,539 | 5/1963 | Mathues et al. | 180—90 |
| 3,130,807 | 4/1964 | McHenry | 180—90 |

LEO FRIAGLIA, *Primary Examiner.*

MILTON BUCHLER, *Examiner.*

J. H. BRANNEN, *Assistant Examiner.*